US006982648B2

(12) United States Patent
Cros et al.

(10) Patent No.: US 6,982,648 B2
(45) Date of Patent: Jan. 3, 2006

(54) LIGHTING OR INDICATING LIGHT UNIT FOR A VEHICLE AND LIGHTING OR INDICATING SYSTEM EQUIPPED WITH AT LEAST ONE SUCH LIGHT UNIT

(75) Inventors: Christophe Cros, Bobigny Cedex (FR); Alexis Dubrovin, Bobigny Cedex (FR); Patrick Lacombe, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 346 days.

(21) Appl. No.: 10/253,549

(22) Filed: Sep. 24, 2002

(65) Prior Publication Data

US 2003/0067220 A1 Apr. 10, 2003

(30) Foreign Application Priority Data

Sep. 24, 2001 (FR) .................................. 01 12399

(51) Int. Cl.
*G08B 21/00* (2006.01)

(52) U.S. Cl. .................... 340/641; 340/642; 307/10.8; 701/36

(58) Field of Classification Search ................ 340/641, 340/438, 441, 539.24, 642; 307/9.1, 10.8; 315/82, 77, 78; 361/173, 752; 701/36, 49
See application file for complete search history.

(56) References Cited

U.S. PATENT DOCUMENTS 4,952,571 A 8/1990 Redpath et al. ............. 514/254
5,244,397 A * 9/1993 Anhalt ....................... 439/101
5,329,206 A * 7/1994 Slotkowski et al. ........ 315/159
5,424,586 A * 6/1995 Hattori et al. ............. 307/10.1
5,793,615 A * 8/1998 Bach et al. ................. 361/752
5,832,397 A * 11/1998 Yoshida et al. ............... 701/29
5,892,893 A * 4/1999 Hanf et al. ..................... 714/3
6,255,639 B1 * 7/2001 Stam et al. .............. 250/208.1
6,282,668 B1 8/2001 Neudecker .................. 713/324
6,714,128 B2 * 3/2004 Abbe et al. ................. 340/468
6,728,393 B2 * 4/2004 Stam et al. ................. 382/104

FOREIGN PATENT DOCUMENTS

DE 199 46 774 A1 4/2001

OTHER PUBLICATIONS

Embacher, M.M., "DC Motor Control in Vehicle Body Applications as a Practical Example of a Cost Competitive can Networking Solution," *Ingenieurs De L'Automobile*, No. 692, Oct. 1, 1994.
French Search Report, May 28, 2002.

* cited by examiner

*Primary Examiner*—Jeffery Hofsass
*Assistant Examiner*—Eric Blount
(74) *Attorney, Agent, or Firm*—Morgan & Finnegan, LLP

(57) ABSTRACT

A light unit or indicating device for a vehicle (.e.g., a vehicle lighting unit, a vehicle indicating unit, reversing radars and other systems) has a shell, a light contained in the shell, and an electronics card mechanically associated with the shell. The electronics card is connected an electrical power supply and to a multiplexed bus of an on-board network. The card has a controller for the light that allows exchange of commands and information on status of the light unit over the multiplexed bus, and also has an internal bus connected to the controller and the light that allows exchange between them of commands generated by the controller and of the status information of the light unit. The unit may also have an ancillary component for implementing ancillary facilities such as light beam adaptation or automatic adjustment of the orientation of the light beam.

16 Claims, 2 Drawing Sheets

LIGHTING OR INDICATING LIGHT UNIT FOR A VEHICLE AND LIGHTING OR INDICATING SYSTEM EQUIPPED WITH AT LEAST ONE SUCH LIGHT UNIT

FIELD OF THE INVENTION

The present invention relates to a lighting or indicating light unit for a vehicle. It also relates to a lighting or indicating system equipped with at least one such light unit. It extends directly to indicating devices, such as vehicle lights but also to other similar products such as reversing radars and other systems.

BACKGROUND OF THE INVENTION

In the prior art, products for vehicles whose lighting function or indicating function is defined by standards, especially national standards, have already been proposed. Moreover, particularly in the automotive sector, the use of on-board computers has led to the introduction into vehicles of concepts derived from information technology. As a result, the product referred to as a headlamp or the product referred to as an indicating light has taken on a structure which has enabled it to be developed towards an on-board network architecture. Since then, the majority of vehicles have been fitted with a computer connected to various peripherals via an on-board network.

One example of an on-board network for vehicles is the CAN network. A network of this kind makes it possible, in particular, to reduce the number of conductors along which the signals and supply voltages pass, as regards the signals in particular by time multiplexing the information passing along the bus of the network.

Given the improvements to the lighting functions and indicating functions, the multiplication of different versions of the same vehicle, versions of the same light unit or versions of the same indicating light having different characteristics, new functions, each linked to lighting or indicating have already been proposed.

For example, the use of discharge lamps for lighting requires that the orientation of the light unit should be corrected in a dynamic manner in certain configurations so as to prevent drivers approaching the vehicle fitted with them from being dazzled by the lighting power of a light unit of this kind.

Use has therefore been made of the possibilities of extending the on-board network by adding one or more ancillary facility controllers, in this case, for example, to control one or more motors for correcting the attitude or orientation of the light unit relative to the chassis and/or to the road, each controlling electromechanical devices acting on the orientation of the light beam produced.

However, to connect each of these ancillary facility controllers to the electromechanical device associated with the light unit, it is necessary to use a harness for connecting the light unit to the network. As a result, the number of conductors in the vehicle increases with each function added to the light unit.

Since the lengths of these conductors can be significant, this results in an increase in the risk of electromagnetic interference, an increase in the risk associated with cutting wire harnesses for electrical connection when working on the vehicle, and a reduction in the reliability of operation, owing especially to cluttering of the engine compartment.

Moreover, for each additional function on a particular vehicle, it is necessary to calculate a new wire harness for electrical connection, and management of such a solution becomes prohibitive, especially with the multiplication of available options when purchasing a type of vehicle of the same make.

Furthermore, over and above questions of aesthetic appearance specific to each motor-vehicle manufacturer, the requirements of two motor-vehicle manufacturers can differ as regards the behaviour of the same lighting or indicating function, forcing the manufacturer of motor-vehicle components to develop a special type of light unit or light for each of them, increasing their design costs.

The invention provides a remedy to these disadvantages of the prior art. In the text which follows, it will be understood that the functions of lighting and indicating are similar as regards the problem posed and as regards the solution provided by the invention, unless otherwise stated.

SUMMARY OF THE INVENTION

In fact, the said invention relates to a lighting or indicating light unit for a vehicle, of the type comprising a shell containing lighting and/or indicating means and possibly ancillary facility means for implementing ancillary facilities such as light beam adaptation or automatic adjustment of the orientation of the light beam. The light unit of the invention essentially includes, mechanically associated with its shell, an electronics card including:

- a supply connector to an electrical power supply device;
- a standard connector, whatever ancillary facilities are activated on the light unit, the said standard connector being intended to be linked to the multiplexed bus of an on-board network;
- control means for controlling the lighting means and possibly the ancillary facility means, the said control means being connected to the said supply connector and to the said standard connector in such a way as to allow commands and information on the status of the light unit to be exchanged over the multiplexed bus;
- an internal bus connected, on the one hand, to the control means and, on the other hand, to the lighting means and to the ancillary facility means for exchange between them of commands generated by the control means and of information on the status of the light unit.

The invention relates to a lighting and/or indicating system for a vehicle including at least one lighting and/or indicating light unit incorporating an electronics card or controller, which is connected by a standard connector to the harness of the multiplexed bus of an on-board lighting and/or indicating control network.

BRIEF DESCRIPTION OF THE DRAWINGS

Other characteristics and advantages of the present invention will be better understood with the aid of the description and the attached drawings, in which.

DESCRIPTION OF THE PREFERRED EMBODIMENTS

Figure 1:
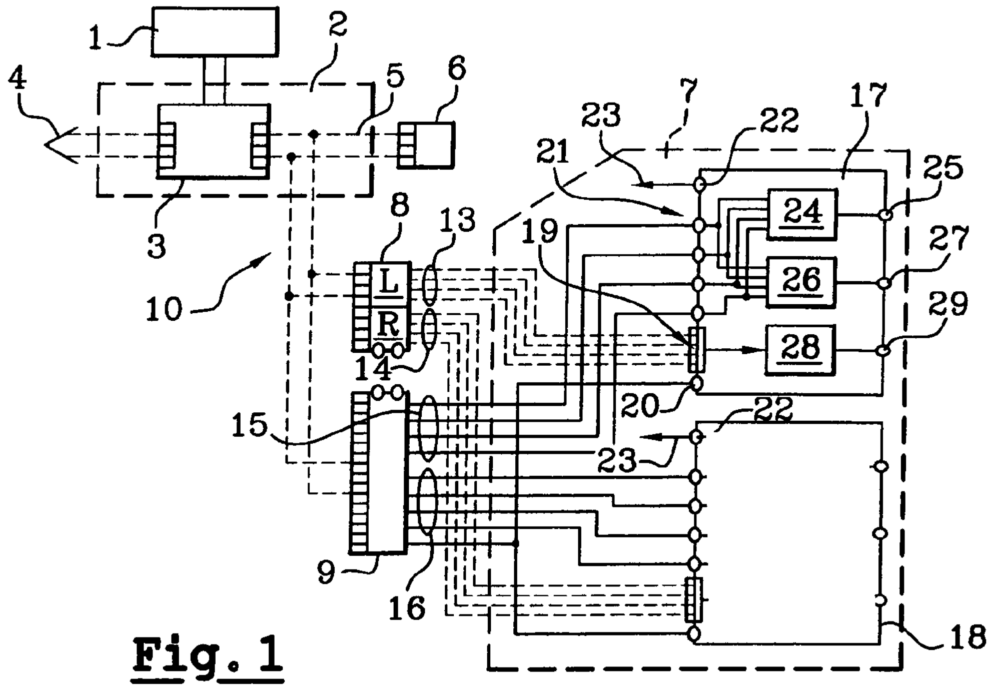
FIG. 1 illustrates an exemplary embodiment of a lighting control system in accordance with the prior art.

FIG. 1 shows a computer 1 on board a vehicle, which is connected to different loads by a network, which has been represented schematically in the rectangle 2.

The on-board network 2 includes a bus controller 3, which carries connectors on harnesses, such as the harness 4 leading towards other peripherals, and the harness 5 leading towards a peripheral 6, and the harness 10 leading towards a lighting controller 9 and an ancillary facility controller 8.

The two controllers 8 and 9 can be arranged in the compartment for the engine of the vehicle (not shown) and are connected to the two light units via four harness elements, the harness elements 13 coming from a part 8L and 14 coming from a part 8R of the controller 8 and the harness elements 15 and 16 coming from the controller 9 respectively.

Each controller has means for activating the left-hand light unit, such as the light unit 17, or the right-hand light unit, such as the light unit 18.

In FIG. 1, the control means activated directly by the controllers 8 and 9 have been shown only on the light unit 17.

In the case of a vehicle fitted with a discharge lamp, the light unit also includes customary filament lamps, which are put into operation with the aid of a series of controlled switches 24, and they also include a ballast, which is an electronic circuit that allows the discharge lamp connected to it to be put into operation, kept alight and monitored.

To this end, the lighting controller 9 is connected by the harness 15 to appropriate inputs of the light unit 21 and the various control signals, which are decoded and implemented in the modules 24 and 26.

The outputs of the modules 24 and 26 are connected to the conventional filament lamps by the point 25 and to the discharge lamp by the point 27 respectively.

Finally, the use of a discharge lamp in a motor-vehicle headlamp requires that there be a means of adjusting the orientation of the light unit as a function of the instantaneous position of the vehicle on the road. In fact, discharge lamps produce a high-intensity luminous flux. The driver of a vehicle approaching a vehicle fitted with a discharge lamp may be dazzled, and accidents must be avoided by preventing the upper part of the lighting light beam from reaching the level of the face of drivers of oncoming vehicles.

The means of control 28 of an orientation control motor 29 is connected by a connector 19 to a harness 13 issuing from the part L of the attitude controller 8. The attitude controller receives information from the onboard computer 1, such that a program stored in the controller 28 is executed so as to allow the upward excursion of the light beam to be reduced when the vehicle performs an oscillating motion linked to the chaotic variation in conditions on the road.

Finally, the light unit incorporates diagnostic functions 22, which are connected to a means 23 for using diagnostic information on the on-board network, this requiring an additional connection on the multiplexed bus.

The right-hand light unit 18 is identical and will not be described further.

In the example of the prior art in FIG. 1, it will be appreciated that the connection harnesses between the computers 8 and 9 and the light units 17 and 18 will be multiplied as soon as the number of ancillary facilities is increased.

It will also be noted that each connection harness 13 to 16 can have a not inconsiderable length relative to electromagnetic activity damaging to the vehicle's environment.

Figure 2:
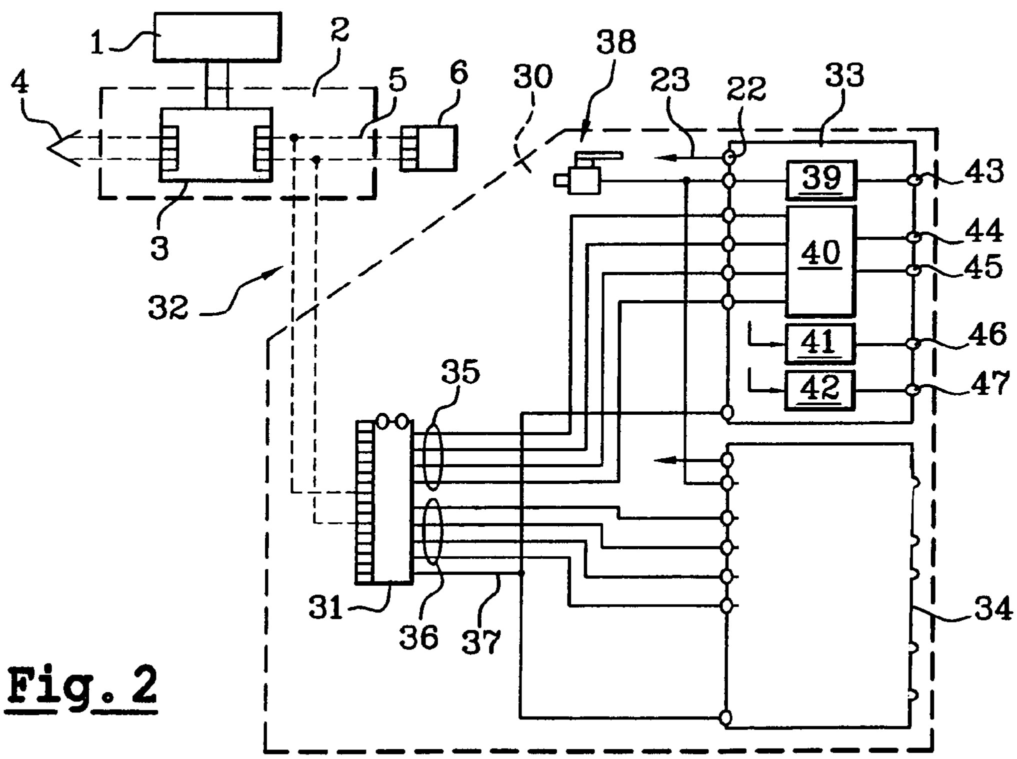
FIG. 2 illustrates another exemplary embodiment of a lighting control system in accordance with the prior art.

FIG. 2 shows another example of a control system 30 for two light units in accordance with the prior art, in which the ancillary facility controller 8 and the lighting controller 9 of the example described above have been integrated into a single controller 31 linked to the two light units, one on the left and one on the right, by separate connection harnesses due to the fact that the two light units are relatively far apart when mounted on a vehicle.

Either the central unit or the orientation-control controller is therefore eliminated, and the cost of the overall system is reduced thanks to the reduction in the cost of the levelling orientation function, which has been transferred to the integrated controller 31.

In FIG. 2, the same elements as those in FIG. 1 bear the same reference numeral and are not described further.

The control system 30 essentially includes three parts, which are formed by the controller 31 and two electronics cards, the electronics card 33 being arranged near to the left-hand light unit and the electronics card 34 being arranged near to the right-hand light unit. The control system 30 overall is connected by a first connection harness 32 to the network 2 and by two connection harnesses to the two light units, one on the right and one on the left.

The integrated controller 31 simultaneously performs the function of controlling the lighting proper (switching on, control, switching off) and the function of controlling orientation, especially in the case of a xenon lamp.

The controller 31 is connected by a first harness 35 to the appropriate inputs of the left-hand light unit 33 and by a harness 36 to the appropriate inputs of the right-hand light unit 34.

Electrical earth distribution is accomplished from the controller 31 with the aid of a conductor 37, which is routed separately to the light units 33 and 34, the rest of the supply to which is performed separately.

In the previous exemplary embodiment, shown in FIG. 2, four conductors are necessary to perform the lighting control function. The four wires are connected directly to a lighting control circuit 40, which features two outputs 44 and 45 respectively for switching on or off two lamps, allocated respectively to dipped-beam operation and passing-light operation.

The same group of four inputs is connected respectively to a control module 41, which performs the function of electronic control of a xenon lamp, which is connected by the terminal 46 and of a controller 42, which is connected by its output terminal 47 to a long-range driving lamp.

The electronics card 33 can furthermore include a terminal for connection to members for controlling the orientation of the light beam, such as the device 38. The signal received from the terminal is transmitted to an information input with a single conductor, which is connected to the controller 39, which allows automatic orientation of the light unit to be performed by means of an electric motor connected to the output terminal 43.

In the previous exemplary embodiment, shown in FIG. 2, the controller 31 is arranged close to the dash-board, in the passenger compartment of the vehicle, while the light units 33 and 34 are arranged in the engine compartment, close to the headlamps. The controller 31 has a structure set by masking an integrated circuit and it is adapted to a specific type of light unit.

According to the invention, in contrast, the system for controlling the light units is completely integrated into each light unit in such a way that the number and length of the connection harnesses are reduced so as to improve reliability of operation.

To this end, each light unit thus includes an electronics card, on which is mounted an integrated controller including both means for controlling lighting means and means for controlling ancillary facility means. The lighting means and the ancillary facility means, or only some of them, are installed on a given light unit. However, the integrated controller of the electronics card of each light unit is perfectly capable of controlling any of them. In the rest of the description, a distinction will not always be made between the electronics card and the integrated controller which it carries, in the knowledge that, depending on the implementation of the invention, one or more integrated circuits are necessary and that, if a number of them are necessary, it is not absolutely essential to employ a support of the printed-circuit type, it being possible, for example, to make direct use of the body of the light unit, which is coated locally with an insulated metallic substrate.

One advantage of the invention is that it allows the development of a range of light units over time or allows a choice of ancillary facility options, in particular, or a choice of various ancillary facility designs prompted by innovations in future vehicles. Thus the invention allows the development of a light unit based on a multi-level platform principle, as will be explained with the aid of FIG. 3.

Figure 3:
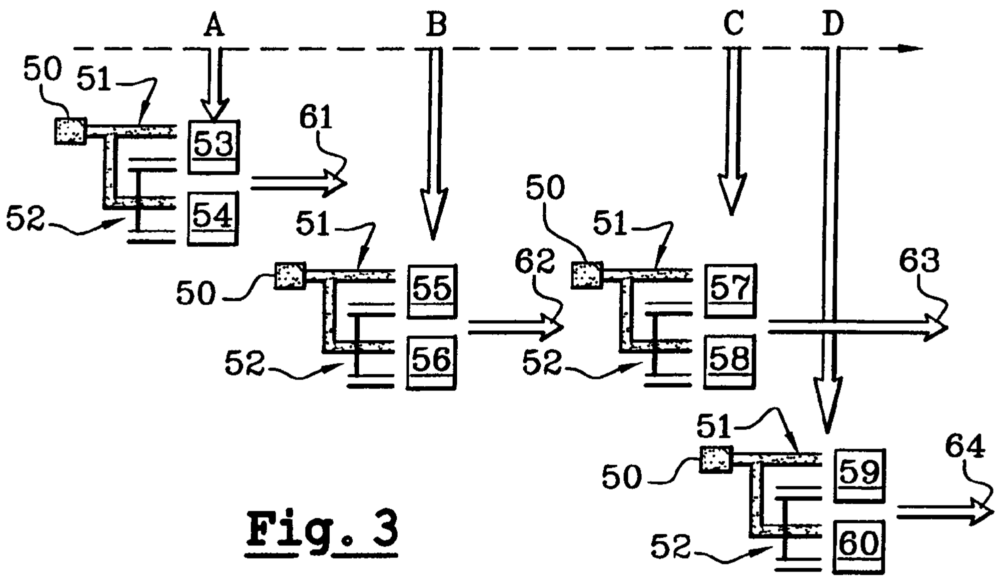
FIG. 3 represents a diagram illustrating the means of the invention to allow the development of a platform on four levels.

FIG. 3 shows a platform with four levels A to D, each level corresponding to a development in a range of lighting and/or ancillary facilities offered.

One advantage of the invention is to enable the computer and the network to remain strictly identical for the entire platform, with only certain elements of the controller integrated into the light unit being changed, in particular simply by programming, depending on the new ancillary facilities that are added from level to level.

At level A of the platform, the network controller 50 actuates or activates a harness 51 for connection to the multiplexed bus of the vehicle in such a way as to exchange commands and status information of the light unit addressed on the multiplexed bus with the on-board computer of the vehicle (not shown). The electronics card 53 or 54 is fitted with a controller (not shown) which participates in this communication via a standard connector, whatever the lighting functions or ancillary facilities activated in the light unit. Moreover, the electronics card 53 or 54 is connected to the electrical supply network of the vehicle by a supply connector (not shown) by a second harness 52. The electronics cards are associated with the light units on the left (card 53) and on the right (card 54) in such a way as to produce a set 61 of lighting functions and ancillary facilities determined according to the level within the platform envisaged.

Halogen-type lamps and simple manual adjustment of the orientation of the light unit are provided in the equipment of a light unit at level A of the platform.

At level B of the platform, the electronics card 55 associated with the left-hand light unit and the electronics card 56 associated with the right-hand light unit are each provided with the same integrated controller as the cards 53 and 54 of the light units of level A of the platform. In the same way, the harnesses 51 and 52 and the bus controller 50 are retained for all the levels of the platform. The advantage of the invention—standardising a significant number of components of a lighting system—will therefore be appreciated. The majority of the control means can be kept on the electronics card, and they are merely validated by the entry of a level identifier (A to D) into the platform, such that, merely by programming the integrated controller, only the lighting functions and the ancillary facilities authorised at the level under consideration are activated.

In a light unit at level B of the platform, the beam produced by the headlamps can be adapted in accordance with the technology of discharge lamps, as well as an ancillary facility for the dynamic orientation of the light unit accomplished as described with the aid of FIG. 2.

At level C of the platform, the technology of discharge lamps has been integrated into a dual-function light unit, and ancillary facilities for adapting the lower part of the lighting beam in accordance with technologies for lighting on bends, as known to the person skilled in the art. The electronics cards 57 and 58 are substantially identical to the electronics card 55 and 56 at level B. However, the lighting functions and the ancillary facilities available in implementation 63 are more extensive than those in the implementation 62 at level B.

In this case, the ancillary facilities that enable the dual function of the discharge-lamp type and the adapting of the bottom part of the light beam to be achieved are integrated directly onto the cards 57 (left-hand light unit) or 58 (right-hand light unit).

At level D of the platform, AFS corrections, also referred to as "intelligent lighting" corrections of the bottom part of the lighting beam of the discharge-lamp type are provided, as are dynamic orientation functions, which have already been described. Ancillary facilities linked to electro-optical accessories such as a LIDAR or an infrared lighting system are added.

According to the invention, most of the necessary means for the implementation of the various ancillary facilities do not change over the entire platform.

By virtue of this fact, the problem posed at the beginning of the present description has been solved, having, on the one hand, shortened the length of the harness and, on the other hand, eliminated the multiplication of controllers in the prior art.

Moreover, there is now available a technology that makes it possible to keep only a single electronic control card, which develops according to the requirements of a range or of a platform.

In the case of a system having a function for lighting on bends, when the device is fixed in an angular position it is possible to use a sensor that indicates to the lighting controller that the orientation motor is locked in an angular position, the controller issuing at that moment an additional command to an orientation motor for setting the optical system to an anti-dazzle position.

This function of locking the beam at a non-dazzling level can be implemented without the need for the reception of a command coming from outside the light unit, and in particular without overloading either the network or the computer partly on board the vehicle.

Finally, it will be noted that all the ancillary facilities and means for implementing these ancillary facilities that are integrated with an electronics card integrated with the light unit share the same supply line (via the lighting controller) and the same means of electrical protection as the rest of the lighting control system.

In one prior art system, the on-board network furthermore includes a diagnostic line specifically for this purpose. According to the invention, the diagnostic line having been eliminated, the bus also exchanges diagnostic data, and the controller for the bus of the on-board network manages both the exchange of data linked to the use of the lighting controller and ancillary facility controller and the exchange of diagnostic data.

The lighting control system of the invention does not require any particular electrical protection of the bus itself because the light unit includes a function for the electrical protection of the supply of the light unit itself.

According to another aspect of the invention, the novel lighting control system of the invention also leads to changes in the definition of lighting systems for vehicles.

In fact, in addition to the current specifications of style, photometry, and thermal and electrical stresses to which the design of a lighting or indicating system has to respond, the invention makes it possible to add a means of characterising the behaviour of the lighting or indicating functions and of the associated ancillary facilities.

This behaviour can be controlled with the aid of a behaviour controller (not shown), which is integrated into the lighting control system. For example, the lighting function for cornering can have different behaviours, smooth or abrupt.

According to another aspect of the invention, the coordination between the right-hand and left-hand functions of the light units can be linear, non-linear or complex.

In one embodiment, the control of lighting is anticipated at the level of the lighting control system by using information available on the network, such as the speed of the vehicle, the acceleration of the vehicle or navigation instructions.

To this end, the parameters used for anticipation are entered in an anticipation controller, which produces an anticipated lighting control value, such as the switching on or off of a lamp, the increasing or reduction of the luminous flux produced by one of the lamps, and/or a function command of the AFS or intelligent lighting type, and/or a command to change the orientation of the light beam.

In one embodiment of the invention, the lighting control system of the invention includes means that allow the lighting or indicating performance and the technical signature of the light unit or light to be specified.

In fact, depending on the style of the vehicle that a motor-vehicle manufacturer wants to design, the operating parameters of the lighting or indicating system and of the various ancillary facilities associated with them within the scope of the present invention can be determined in registers read during at least one parameterisation stage of the functioning of the lighting control system of the invention so as to give consistency of behaviour between the various components of the vehicle, this consistency determining the desired character of the vehicle and/or of the manufacturer's mark.

To this end, the electronics card of the light unit of the invention includes a means which selects a class of performance for the light unit and its ancillary facilities, such as the lighting range, the speed of response of the dynamic orientation of the light unit, etc as a function of a signature which is loaded when the vehicle is started.

According to another aspect of the invention, the electronics card of each light unit is provided with means that allow the lighting means and/or the ancillary facility means to be connected and disconnected or allow one parameter of their operation to be controlled and, possibly, with means for carrying out diagnostics on the operating status of the said lighting means and of the said ancillary facility means.

According to another aspect of the invention, the electronics card of the light unit of the invention includes a means for implementing the connection of the light unit to the multiplexed bus of the vehicle in such a way as to ensure periodic communication between the light unit and the vehicle.

During this periodic communication, control commands coming from the on-board computer that communicates over the multiplexed bus and reaching the light unit are introduced, as is information on the status of the light unit, in particular of the lighting means and of the various ancillary facility means mentioned above. As a result, the on-board computer continuously monitors the status of the lighting system, the commands being notified to it.

It is thus possible to automatically carry out diagnostics and to take appropriate measures as a function of critical situations, particularly when situations involving failure are detected, in which it is possible to put a light unit, a lamp of a light unit or an ancillary facility means of the light unit in a downgraded operating mode.

According to another aspect of the invention, the lighting control system can include a module for regulating the supply energy. To this end, the electrical supply cable of the light unit is connected to the output of a supply regulator. The supply regulator makes it possible to reduce the variations in the direct supply voltage within a range of variation that protects the filament lamps, both incandescent and halogen lamps, arranged in the light units, thereby optimising their life.

According to another aspect of the invention, the general electrical energy supply system of the vehicle no longer receives significant surges in current demand from the lighting system. In fact, the integrated controller of the electronics card of the light unit of the invention includes a module for sequencing the switching on of the various loads included in a light unit, in such a way that the different loads are supplied according to schemes that make it possible to optimise the smoothing of the inrush currents.

According to another aspect of the invention, the source of electrical energy supply of the vehicle can be at different voltages for the same type of light unit.

Thus, if it is desired to adapt the lighting control system of the invention to a 42-volt source of supply, while the lighting control system is designed for supply at 12 volts throughout, the electronics card of the light unit of the invention is fitted with a dc-dc converter that converts the new voltage of 42 volts into a voltage of 12 volts due to the fact that the entirety of the control formed by the electronics card of the light unit of the invention comprises a single electrical supply cable.

Figure 4:
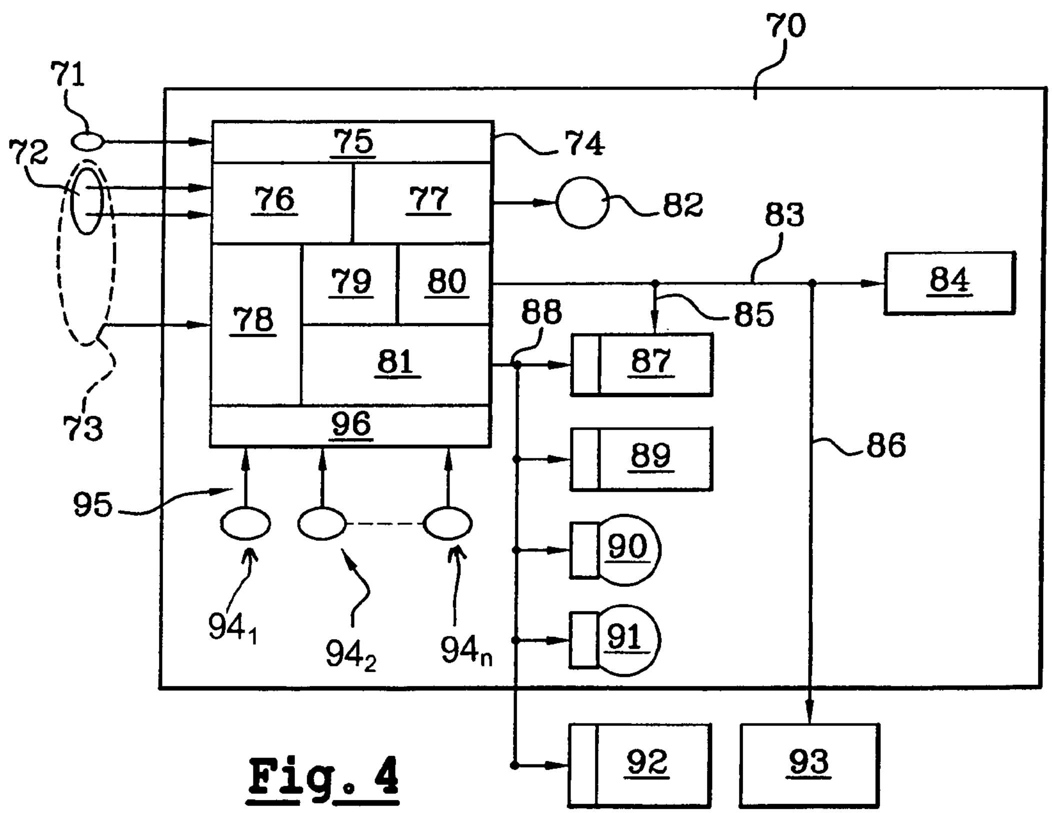
FIG. 4 is a block diagram of a light unit in accordance with one embodiment of the present invention.

FIG. 4 shows an embodiment of a light unit according to the invention. The light unit 70 includes a first connector 71, which is connected to the electrical energy supply harness of the vehicle. It includes a second standard connector 72 connected to the multiplexed bus of the on-board network as described above.

In a variant, the network features a bus that has a third connector 73, which is assigned to the driving of the network.

The light unit 70 furthermore incorporates a controller 74, which includes electronic components for carrying out the control of the lighting functions and of the ancillary facilities, complemented if necessary by appropriately dimensioned power components (MOS transistors, motor drivers etc . . . ), which are connected within the light unit 70 in such a way that the lighting functions and the ancillary facilities described by way of example with the aid of FIG. 3 are assured.

The integrated controller 74 includes a module 75 for managing the electrical supply, which is connected directly to the supply connector 71.

The module 75 for controlling the supply makes it possible, in particular, to perform the functions of regulation and sequencing of switching on that have been described above. The various components of the light unit are supplied directly via this control module. The controller 74 furthermore includes an input module 76, which is connected to the network via the standard bus connector 72.

The controller 74 furthermore includes a module 77 for driving electric motors, which are employed for the various ancillary facilities mentioned above, such as automatic adjustment of orientation.

The controller 74 optionally includes a module 78 for controlling the network, which makes it possible to exploit the information output from the bus via the connector 73 described above.

The controller 74 includes a central unit 79, which communicates with memories and the various modules which have already been described.

The controller 74 includes a switching module 80, which makes it possible to set the various electrical loads associated with the light unit 70, such as the loads 84, 87 or 93, to the supply voltage controlled by the module 75 of the controller 74.

To this end, the supply switching module 80 of the controller 74 has an output port which is connected to power conductors 83 within the light unit. The conductors 83 are connected to all 84 of the lamps, which are subjected to controlled switching.

Moreover, the conductors 83 are connected to the various electronic power-control circuits, such as the electronic control circuits or ballast 87, by a conductor 85.

The conductors 83 are also connected by internal conductors 86 to all the lamps 93 mounted on the outside of the light unit 70, which are controlled directly by the switching module 80.

The controller 74 furthermore includes a bus driver module 81, which features an access port to a bus 88 within the light unit of the invention. The bus 88 allows commands and status information to be exchanged with the various ancillary facilities and ancillary facility modules of the headlamp.

In particular, the bus 88 can be connected to a module for command and control of the ballast 87, to a module for controlling an opto-electronic sensor 89, to a module for controlling an actuator 90, to a module for controlling functions for controlling the orientation of the light beams on bends, and for controlling an actuator 91 for adapting the bottom of the light beam produced by the light unit in accordance with the AFS or intelligent lighting functionalities.

In a variant in which additional electronic functions are added at the front of the vehicle, the bus 88 is also connected to a module 92 for command and control of status, which manages these additional functions.

Finally, the light unit 70 incorporates a plurality of sensors 94 for the status of the light unit and essentially sensors for the failure of the various actuators 90, 91, 89 of the light unit 70. The controller 74 incorporates a module 96 for processing information on the status of the light unit 70 produced by the sensors for the status of the light unit 70. The information is transmitted by the sensors 94 to the module 96 for processing status information via lines 95, depending on circumstances, or is processed locally by the controller 74 or indeed returned, after appropriate formatting, to the on-board network for processing by the vehicle's on-board computer. In particular, the module 96 includes means for placing all or some of the lighting functions and/or of the ancillary facilities in a downgraded mode when a corresponding state of failure has been detected.

What is claimed is:

1. A light unit for a vehicle comprising a shell containing light means—and an electronics card mechanically associated with the shell, wherein the electronics card comprises:

a supply connector to an electrical power supply device;

a standard connector being intended to be linked to a multiplexed bus of an on-board network of the vehicle;

control means for controlling the light means, said control means being connected to said supply connector and to said standard connector to allow commands and information on status of the light unit to be exchanged over the multiplexed bus; and an internal bus connected to the control means and to the light means for exchange between them of commands generated by the control means and of the status information.

2. A light unit according to claim 1, wherein the control means comprises an integrated controller connected, within the light unit, to the multiplexed bus and to a plurality of electrical loads of the light unit that are subject to control of the control means.

3. A light unit according to claim 2, wherein the integrated controller is connected to a bus controller by a first harness and to a vehicle electrical supply device by a second harness, and in that the totality of the light functions can be controlled entirely by the same integrated controller, which includes means for activating only the light functions reserved to a platform level.

4. A light unit according to claim 2, further comprising a system for lighting on bends comprising an angular sensor adapted to sense an angular position of the light unit, and an orientation motor adapted to control orientation of the light unit, wherein, when the light unit is in a fixed angular position, the angular sensor indicates to the integrated controller that the orientation motor is locked in an angular position, the integrated controller issuing at that moment an additional command to the orientation motor for setting the system for lighting to an anti-dazzle position, without the need for the reception of a command coming from outside the light unit.

5. A light unit according to claim 2, wherein the multiplex bus also exchanges diagnostic data, and a controller for the bus of the on-board network manages exchange of data linked to use of the integrated controller and diagnostic data.

6. A light unit according to claim 2, wherein the control of light is anticipated by using information available on the network, which produces an anticipated light control value, and/or a command for a function of the AFS or intelligent lighting type, and/or a command to change orientation of a light beam of the light unit.

7. A light unit according to claim 2, further comprising means for allowing a light performance and a technical signature of the light unit to be specified, depending on a style of the vehicle that a motor vehicle manufacture wants to design, a plurality of operating parameters of the light system being determined in registers read during at least one parameterization stage of a lighting control system so as to give a consistency of behavior between the various components of the vehicle, this consistency determining the desired character of the vehicle and/or of the manufacturer's mark, the lighting control system including selection means which selects a class of light performance for the light unit as a function of the technical signature which is loaded when the vehicle is started.

8. A light unit according to claim 2, further comprising means for implementing the connection of the light unit to the multiplexed bus of the vehicle to ensure periodic communication between the light unit and the vehicle and the on-board computer continuously indicates status of a lighting system, the commands notified to the on-board computer and diagnostics are carried out automatically and appropriate measures adapted as a function of critical situations are taken to selectively put a component selected from the group of: (i) a light unit, (ii) a lamp of the light unit, and (iii) ancillary facility means of the light unit in a downgraded operating mode.

9. A light unit according to claim 2, wherein the light means comprises at least one filament lamp, and the light unit further comprises:

a module for regulating supply of energy to the light unit, and an electrical supply cable being connected to an output of the supply regulating module so as to reduce variations in a direct supply voltage within a range of variation that protects filaments of the light unit.

10. A light unit according to claim 2, wherein a general electrical energy supply system of the vehicle no longer receives significant surges in current demand from the light unit, and wherein the integrated controller of the light unit further comprises a module for sequencing switching on of a plurality of loads included in the light unit, to supply the loads according to a plurality of schemes to optimize smoothing of an inrush current.

11. A light unit according to claim 1, wherein the integrated controller further comprises at least one component selected from the group consisting of:

a module for managing the electrical supply, which is connected directly to said supply connector so as to perform regulation and sequencing of switching on of the electrical supply;

an output module, which is connected to the network via said standard connector on the multiplexed bus of the vehicle;

a module for driving electric motors, which are employed for the various functions;

a module for controlling the network, which exploits the information output from the bus via the connector;

a central unit, which communicates with memories and the various modules;

a switching module, which sets different loads to a supply voltage controlled by the switching module via an output port which is connected to a plurality of conductors allocated to the light unit, the said plurality of conductors being connected to all of a plurality of lamps of the light unit, which are subjected to controlled switching, connected to the various electronic power control circuits by a plurality of conductors, and connected by a plurality of conductors to all the lamps, which are controlled directly by the switching module;

an internal bus driver module, which features an access port to the internal bus for the exchange of the commands and status information for a plurality of various ancillary facilities and ancillary facility modules of a lighting control system, to a module for command and control of a ballast to an opto-electronic sensor, to an actuator, functions for adapting orientation of a light beam of the light unit to control the light beam on bends, and to an actuator for adapting a bottom of the light beam produced by the light unit in accordance with the AFS or intelligent lighting functionalities, and, if additional lamps are added to the light unit, the internal bus is also connected to a module for command and control of status, which manages functionalities at a front of the vehicle;

a module for processing status information of the light unit, which is connected to a plurality of sensors for determining status of the light unit.

12. A light system for a vehicle, comprising:

at least one light unit according to claim 1, each light unit comprising a controller, which is connected by a standard connector to the harness of the multiplexed bus of an on-board control and indicating network.

13. A light unit according to claim 6, wherein the information available on the network is selected from the group consisting of a speed of the vehicle, an acceleration of the vehicle, and navigation instructions, and combinations thereof.

14. A light unit according to claim 6, wherein the anticipated light control value is selected from the group consisting of switching on the light means, switching off the light means, increasing luminous flux produced by the light means; and decreasing luminous flux produced by the light means.

15. A light unit according to claim 7, wherein the class of light performance for the light unit is selected from the group consisting of lighting range, speed of response of dynamic orientation of the light unit and combinations thereof.

16. A light unit according to claim 8, wherein the means for implementing the connection of the light unit to the multiplexed bus of the vehicle ensures introduction into the light unit of commands from the computer, and exchange of information on the status of the light unit.

* * * * *